United States Patent [19]

Davis

[11] 3,797,209

[45] Mar. 19, 1974

[54] VARIABLE WIDTH FRONT MOUNTED MOWER

[76] Inventor: Herbert W. Davis, Box 468-506 E. Baldwin St., Hackettstown, N.J. 07840

[22] Filed: Dec. 29, 1972

[21] Appl. No.: 319,677

[52] U.S. Cl. .................................. 56/13.6, 56/10.4
[51] Int. Cl. ............................................ A01d 75/30
[58] Field of Search ......... 56/6, 10.4, 13.6, DIG. 15

[56] References Cited
UNITED STATES PATENTS
2,960,811 11/1960 Roesel ................................ 56/10.4
FOREIGN PATENTS OR APPLICATIONS
1,413,658 8/1965 France ................................ 56/10.4
80,447 1/1956 Denmark ............................. 56/10.4
966,347 8/1964 Great Britain ....................... 56/10.4

Primary Examiner—Louis G. Mancene
Assistant Examiner—J. A. Oliff
Attorney, Agent, or Firm—Robert G. McMorrow

[57] ABSTRACT

A mowing apparatus has a main housing adapted for attachment forwardly of a prime mover. The housing supports a series of blades and drive mechanisms therefor. Arms are pivoted on the main housing and have auxiliary housings with cutting blades thereon, the arms being urged to lateral positions and being pivotal to rearward trailing positions when the auxiliary housings encounter an obstruction. Means is provided to purposely move and maintain the auxiliary housings in trailing position when desired.

6 Claims, 5 Drawing Figures

VARIABLE WIDTH FRONT MOUNTED MOWER

BACKGROUND OF THE INVENTION

1. Field of the Invention

This invention pertains to mowing apparatus, specifically to apparatus for cutting highway median strips and the like for forward mounting on a prime mover.

2. Statement of the Prior Art

It is heretofore been proposed to provide mowers wherein component assemblies are spring urged to mowing position and are yieldable upon impact from that position. Representative patents are as follows:

| U.S. Pat. No. | Patentee | Issue Date |
|---|---|---|
| 1,570,415 | Sumbulian | Jan. 19, 1926 |
| 2,097,351 | Smith | Oct. 26, 1937 |
| 2,838,901 | Davis | June 17, 1958 |
| 3,045,413 | Sheffer | July 24, 1962 |
| 3,115,739 | Thoen et al. | Dec. 31, 1963 |
| 3,135,079 | Dunn | June 2, 1964 |
| 3,526,083 | Barry et al. | Sept. 1, 1970 |
| 3,545,184 | Liepold et al. | Dec. 8, 1970 |
| 3,550,360 | Van Der Lely | Dec. 29, 1970 |
| 3,599,403 | Gantz | Aug. 17, 1971 |

SUMMARY OF THE INVENTION

In forwardly mounted mowing apparatus, the principal advantage of permitting the operator to mow ahead of the direction of travel of the prime mover has been diminished by reduction of the width of the mower to conform to the limits of the width of the prime mover. This disadvantage is overcome by the provision of lateral auxiliary mowers which pivot about centers located on the leading edge of the main mower housing. This permits the vehicle to travel between obstructions and to return to a full cutting swath upon passing the obstruction.

The mowing apparatus hereof may be driven by a series of hydraulic motors, the motors being located on the mower main housing and on the auxiliary housings. The auxiliary housings are pivoted by contact with an obstruction, and further are pivoted by the operator for transport or the like by actuation of an extensible and retractable cylinder means.

The auxiliary mowers include a shield or deflector which serves to prevent contact of the auxiliary mower blades or housings with obstructions.

The present apparatus is readily operable by relatively unskilled labor, inasmuch as precise steering control is not necessary.

Other and further objects and advantages of the invention will become apparent to those skilled in the art from a consideration of the following specification when read in conjunction with the annexed drawings.

DESCRIPTION OF THE PREFERRED EMBODIMENT

Figure 1:
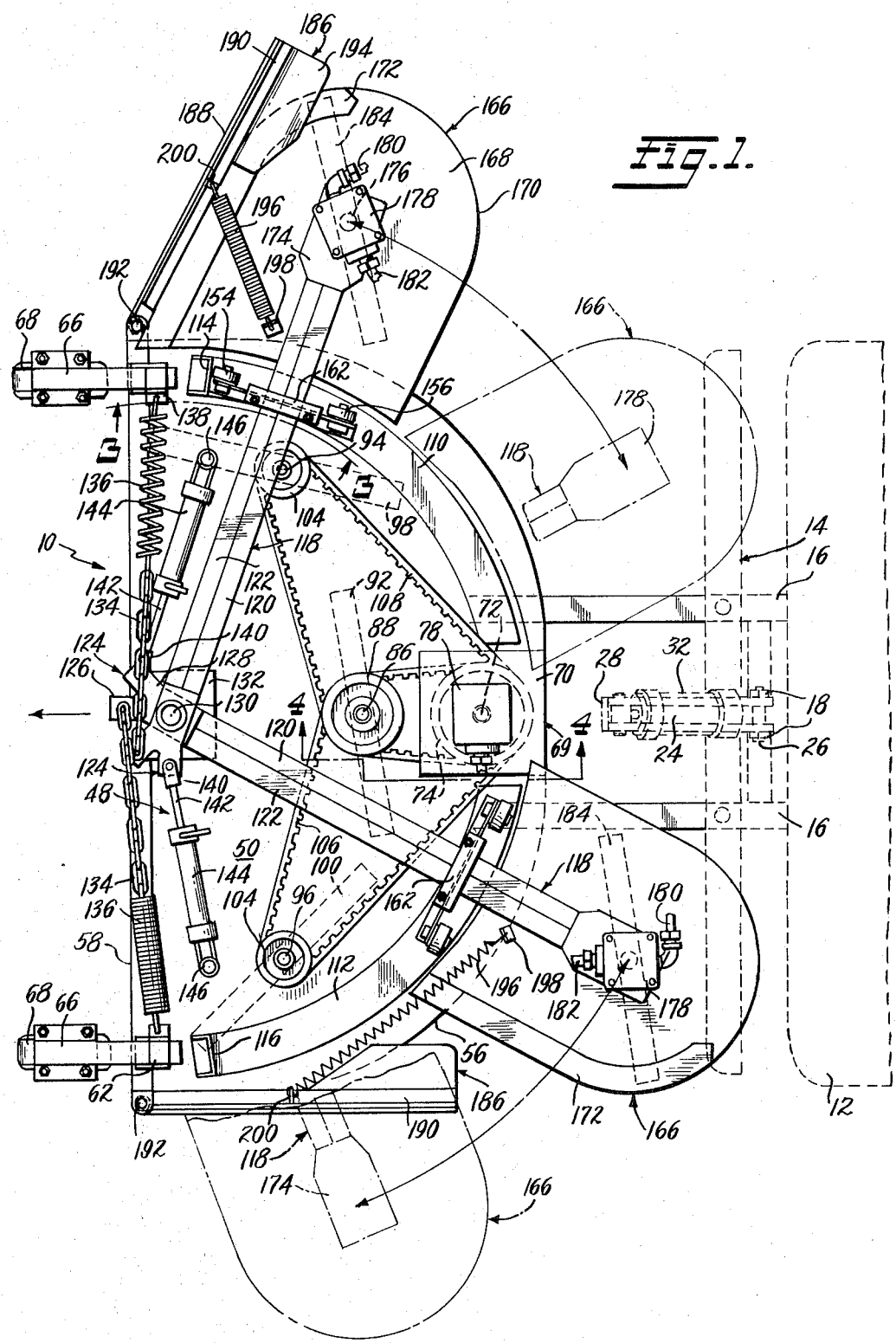
FIG. 1 is a plan view of the mower of the present invention showing the right mowing unit in an extended position and the left mowing unit in a retracted position, the other positions of the respective units being shown in phantom lines.
Figure 2:
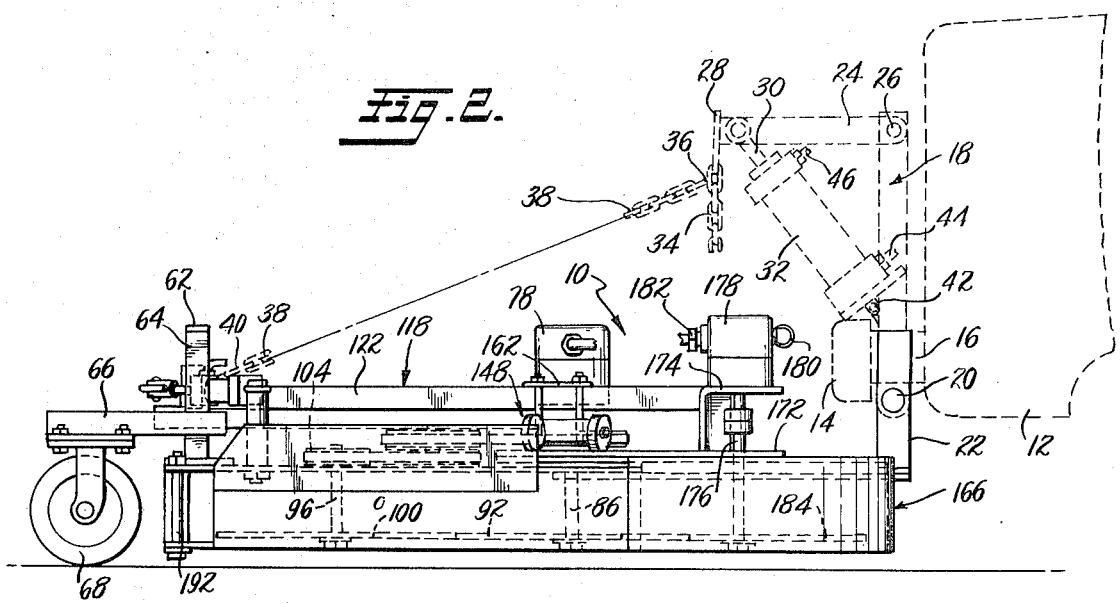
FIG. 2 is a side elevational view of the mowing device of FIG. 1.

Referring to the drawing in more detail, a mowing unit according to the present invention is generally designated in the drawing by reference character 10. The unit 10 comprises a mower adapted for mounting forwardly of a prime mover, such as a truck 12, having a bumper 14. The bumper is supported on a pair of brackets 16. A pair of upright members 18 are mounted between the brackets in a pinion 20, and a series of fixed braces 22 depend from the brackets. The upper end of each upright member 18 has at least one arm 24 secured thereto at a pivot 26. The arm is pivoted, at its distal extremity, to a bracket 28 and to one end 30 of a lift cylinder 32. The bracket 28 has a chain 34 thereon with connections 36 for a pair of lift chains 38 extending to outboard arms 40. The cylinder 32 is anchored, at 42, and has intake and outlet fluid lines 44, 46, to permit extension and retraction responsive to controls (not shown) within the prime mover. Extension of the cylinder serves to raise the arm 24 and to lift the chains 38, thereby raising the mower to an off-ground transport position. The foregoing describes the connection of the assembly 10 to the prime mover and is significant principally in respect to the forward mounting of the apparatus.

The mowing apparatus 10 comprises a mower main housing 48 having an upper deck 50. The deck 50 includes top and bottom sides 52, 54, and has a curvilinear trailing edge 56 and a substantially straight leading edge 58. Secured to the deck adjacent the lateral extremities of its leading edge are base plates 60 for upright stub axles 62. On the axles 62 are sleeves 64 with forward foot members 66 which support ground wheels 68. The height of the ground wheels is adjustable by variance of the relation of the sleeves 64 to the stub axles 62.

Other means of height adjustment of the castor wheels, such as by the provision of a series of openings in the upright component and a corresponding opening in the wheel mount may be utilized where desired. Additionally, a rear horizontal adjustment is desirable in mounts on certain types of vehicles, particularly those having a snow plow push frame. Either a ball and socket joint or a two directional pivot is there desirable in order to permit freedom of motion with minimum angular compensation. This permits the mower to follow ground contours independently of the track frame.

The housing 48 has a motor mount 69 including a reinforcing plate 70 centrally located on the upper side 52 of the deck 50 adjacent the trailing edge 56. Extending through suitable openings in the plate 70 and deck 50 is a drive shaft 72, having two pulley wheels 74, 76, fixed thereto above the plate. On the shaft above the pulley wheels is a conventional hydraulic motor 78 with fluid connections for input and return at 80, 82. The shaft 72 has a collar 84 below the deck 50 to prevent withdrawal of the shaft.

Extending through the deck 50 at a position forwardly of the shaft 72 is a first blade drive shaft 86. The blade shaft 86 has a drive pulley wheels 88, 90, above the deck, and carries a blade 92 below the deck which rotates with the shaft. At lateral and forwardly spaced locations, side blade shafts 94 and 96 extend through the housing. The shafts carry blades 98, 100, respectively, below the housing, and have single pulley sheaves 102, 104 thereabove.

A first drive belt 106 is trained about the pulley wheels 74 and 88 to impart rotation to the sheave 104 and to the blades 92 and 100, while a second belt 108 is engaged about the wheels 76, 90 and the sheave 102, thereby driving the blade 98 and also the blade 92.

Extending in arcs adjacent the edge 56 of the housing on its deck 50 are a pair of substantially flat track members 110, 112, each terminating before contact with the plate 70 and the rear. Forwardly, each track has an upright abutment stop 114, 116. The function of the tracks appears in more detail below.

A main feature of the invention resides in the provision of lateral auxiliary mowers. In this embodiment of the apparatus, the auxiliary mowers are mounted in side housings. The housings are related to the main housing by arm means comprising opposite but otherwise identical arms 118 of elongated construction (see FIG. 3). The arms 118 are each composed of a pair of fixed structural members 120, 122 of hollow rectangular form. At the leading end of each arm, a Y-form yoke plate 124 is provided. Each plate 124 has branch arms 126, 128 and is journaled on an upright cylindrical post 130 fixed in a mounting plate 132 on the deck. The branch arms carry chains 134 secured to coil springs 136 fixed by heavy clips 138 to the sleeve 64 of the wheel at the side adjacent thereto. The other branch arms 128 have clevices 140 pivoted thereon carrying rods 142 extending from extensible and retractable hydraulic cylinders 144. Such cylinders are pivoted at their opposite ends on the mower deck, as at 146. The plates 124 are spaced from one another on the post 130 by a spacer sleeve 147.

Figure 3:
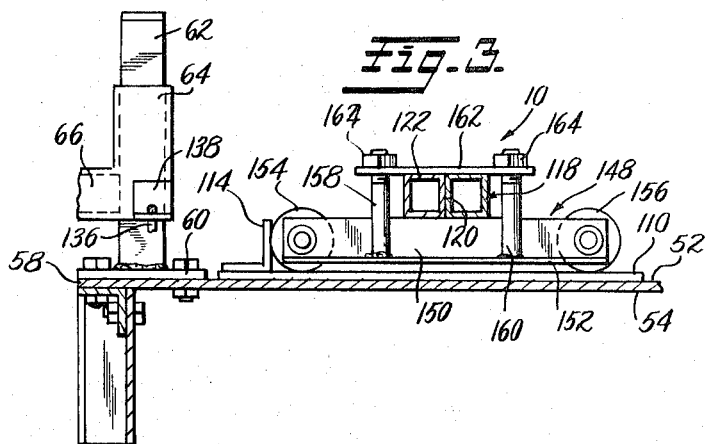
FIG. 3 is an enlarged fragmentary vertical sectional view taken on line 3—3 of FIG. 1.
Figure 4:
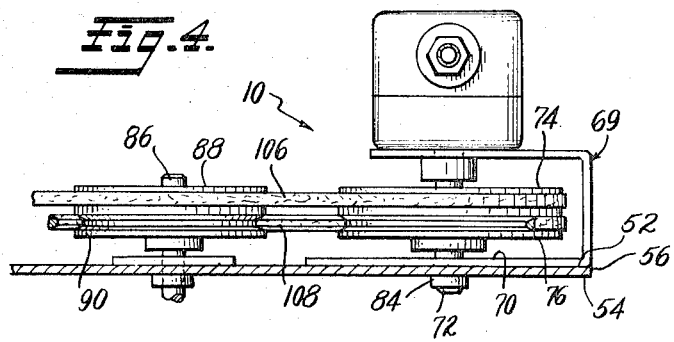
FIG. 4 is a fragmentary vertical sectional view, taken on line 4—4 of FIG. 1.
Figure 5:
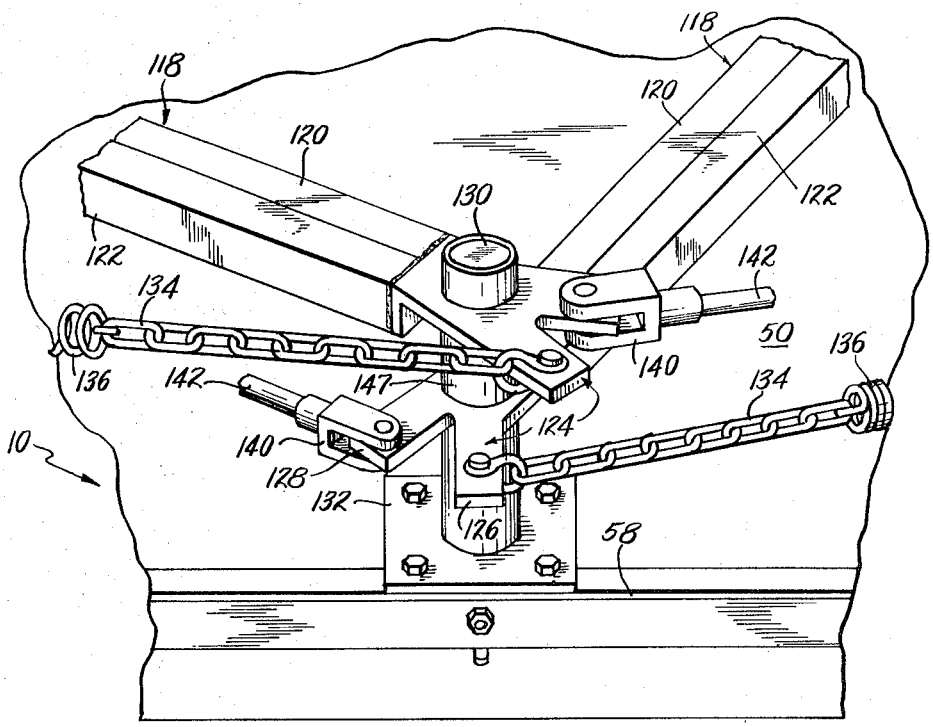
FIG. 5 is a fragmentary perspective view, on enlarged scale, of the forward pivot mount of the auxiliary units.

In FIG. 3, it will be observed that a trolley assembly 148 supports each arm 118 above the respective tracks 110 and 112. These trolley assemblies comprise wheeled carriers made of an L-shaped elongated bar 150 having a foot member 152. Wheels 154, 156 are provided at each end of the bar and contact the tracks whereby the trolley assemblies are movable on the tracks. Posts 158, 160 project upwardly from the foot members and have a bridge 162 which spans the same at their upper ends. Changeable fasteners 164 adjust the tension of the bridge to clamp the trolleys to the respective arms.

Each arm has an auxiliary mower housing 166 mounted on its outer end. The housings again are identical but opposite, and a description of one will suffice for the other. Each has a top deck 168 and outer side skirt 170, the housings being shaped at their proximal sides to conform generally to the contour of the side 56 of the main housing. A reinforcing track 172 is secured on the top 168 about the leading sides thereof.

The housings are supported on end plates 174 fixed to the arms 118. A vertical shaft 176 extends through a suitable bearing in each plate, and a hydraulic motor 178 is suitably retained thereabove. Fluid lines 180, 182 are provided for each motor. A blade 184 is on each shaft 176 below the top 168.

A deflector shield 186 comprising a plate 188 with an inward top flange 190 is pivoted to the side of the main housing on a vertical pivot bolt 192 at each side of the main housing. At its distal end, the flange carries a horizontal wing 194 which serves to guide the deflector with respect to the lateral housing, the wind riding on the track 172. A coil spring 196 is retained at one end on a clip 198 fixed to the auxiliary housing, and at its opposite end on the flange 190, as at 200.

In operation, absent actuation of the cylinders 144, the arms are normally maintained in forward position, e.g., that shown in full lines at the top of FIG. 1, by action of the springs 136. In the event that the deflector 186 strikes an obstruction such as a fence post or the like, force is exerted against the related auxiliary housing which overcomes the retention capability of the spring and causes the auxiliary housing to swing rearwardly until the obstruction is passed. When the obstruction is cleared, the spring returns the auxiliary housing to its outboard position. When transport of the apparatus is desired, the operator may accomplish retraction of the auxiliary housings to trailing position through manipulation of the cylinders 144.

I claim:

1. A variable width mower assembly for mounting on a prime mover, the mower assembly comprising:

a power main housing having a semi-circular upper deck;

means for mounting said main housing to the front end of said prime mover with the arcuate trailing edge thereof facing rearwardly and being spaced from the front end of said prime mover;

main mower blade means and drive means therefor associated operatively with said main housing;

means supporting the main mower housing with respect to the ground;

a pair of elongated arms pivotally secured at a common axis to the center of the main housing adjacent the leading edge thereof, the arms projecting outwardly of the main housing and overlying said upper deck;

an auxiliary mower housing mounted on each arm outwardly of the main housing and movable in an arcuate path about said trailing edge and movable to a position between said prime mover and said main housing;

auxiliary blade and drive means operatively associated with each auxiliary mower housing;

means for variably setting each arm and auxiliary housing to a position lateral of said main housing;

spring means coupled to each arm for urging each arm and its auxiliary housing to a variably set position lateral of the main housing on respective sides of said main housing and beyond the sides of said prime mover;

whereby, said auxiliary housings are pivotal to a trailing position between said main housing and said prime mover upon contact with an obstruction, and are returnable by said spring means to their lateral positions upon passing the obstruction.

2. The invention of claim 1, and;

a shield secured to the main housing ahead of the auxiliary housing.

3. The invention of claim 1, wherein:

the main housing has a leading end wall and a curvilinear trailing end wall; and the auxiliary housing includes a side proximate the curvilinear trailing end wall of complementary curvature.

4. The invention of claim 1, wherein:

each of the arms has a proximal end, of Y-form including a first portion and a second portion;

the common pivot point being inwardly of the proximal ends;

said spring means for urging the arms and auxiliary housings to lateral positions comprising spring means secured to one of said portions and to said main housing; and extensible and retractable fluid pressure operated cylinder means coupled respectively to said housing and said other portion to effect pivoting of the arms independently of an obstruction, said cylinder means being arranged such that impact movement of said arms and auxiliary housings away from the lateral position is unimpeded by the fluid within said cylinder means.

5. The invention of claim 1, and:

arcuate track means on the upper deck; and a wheel carrier supporting the arm on said track means.

6. The invention of claim 1, wherein: the drive means for the mower blades comprises independently actuated motors mounted on said main housing and each of said auxiliary housings.

* * * * *